UNITED STATES PATENT OFFICE.

CARLETON ELLIS, OF MONTCLAIR, NEW JERSEY.

CATALYZER FOR HYDROGENATING OILS AND THE LIKE.

1,060,673.  Specification of Letters Patent.  Patented May 6, 1913.

No Drawing.  Application filed January 3, 1913. Serial No. 740,054.

*To all whom it may concern:*

Be it known that I, CARLETON ELLIS, a citizen of the United States, and resident of Montclair, in the county of Essex and State of New Jersey, have invented certain new and useful Improvements in Catalyzers for Hydrogenating Oils and the Like, of which the following is a specification.

This invention relates to catalyzers and relates in particular to catalyzers suitable for hydrogenating oils, and comprises dissimilar materials such as an active organic and an active inorganic body in admixture, whereby certain desirable coöperative effects are secured.

The object of the invention is to provide a catalyzer of high capacity serving also under certain circumstances as a storage reservoir for hydrogen or other gaseous body employed hereunder. To this end I employ, to serve as an activator and storehouse of hydrogen, a body capable of markedly occluding hydrogen. Such a body is found in specially treated charcoal and similar material. Charcoal has the property of readily absorbing hydrogen and other gases by some occlusive action somewhat akin to formation of solid solutions. Its peculiar action in this respect is difficult of explanation and the absorption is possibly due to condensation of the gas on the surface of the charcoal material. Ordinary charcoal is scarcely suitable for direct treatment but preferably should receive certain processing to render it available for the production of hardened oils of high quality.

The pretreatment of the charcoal preferably consists in the removal of the undesirable or toxic mineral elements present as well as the normally present occluded gases. Preferably the charcoal is washed with hot dilute nitric or other acid to remove lime and other basic bodies and then is treated with dilute and boiling alkali solution such as a 5% caustic soda bath, whereby the acid bodies and certain organic compounds are eliminated to advantage. In some cases the alkaline bath may be omitted but the acid bath is of importance. Without the latter the danger exists that oils charged with lime compounds of fatty acids may arise. Then too in the presence of metallic catalyzers the charcoal must be free from various toxic bodies as well, including well known catalyzer poisons, arsenic, sulfur and the like. The charcoal thus rendered potentially active may be admixed with any other catalytic body such as catalytic metals including platinum, palladium, nickel, cobalt and the like. For example nickel carbonate or hydrated carbonate may be prepared by precipitating nickel sulfate in aqueous solution by means of a solution of sodium carbonate. Or the hydrate may be prepared by precipitation with calcium, barium or sodium hydrate. The precipitate, wet or dry, may be incorporated with charcoal. Blood and bone charcoal are not well adapted to use with nickel catalyzers in this connection but wood charcoal, especially if well carbonized at a low temperature, is specifically useful. Birch wood charcoal carbonized at the lowest possible temperature and then freed from sodium chlorid, lime, magnesia and particularly potash is an excellent active agent to employ with precipitated nickel hydrate and the like. When nickel is used a proportion of nickel compound should be chosen to give preferably not exceeding 20% of nickel in the mixture after reduction, as by so proportioning a better transference of hydrogen is secured. A ratio of nickel to active charcoal of 1:4 or less is therefore desirable; the limiting ratios being preferably 1:10 up to 1:4. Between these ratios the charcoal acts to best advantage, apparently, as a feeder to the nickel, apart from its other active properties.

In the manufacture of a product having the nickel or other metals adhering more or less to the charcoal particles or granules, as well as in the use of any other porous material it is important to not deeply impregnate the granule or particle with the nickel material and the like as reduction in the inner portions of the granule progresses with undesirable slowness and often for example nickel oxid remains after reduction to dissolve in the oil and form nickel soaps to the detriment of the product. When it is desired to have a somewhat adherent nickel coating on a hydrogen reservoir consisting of active charcoal substantially free from interiorly incorporated metal catalyst, I may soak the prepared charcoal in sodium carbonate or other alkali solution suitable for the purpose and then incorporate a solution of nickel sulfate or nitrate and the like. The charcoal alkali mixture should best be in the form of a paste or putty when the nickel solution is added. Precipitation of the nickel occurs but substantially only at the surface of the charcoal or elsewhere than in the interior of the particle in large measure. The mixture may then be washed, dried and reduced in an atmosphere containing hydrogen or other reducing material.

In reducing the composition it is best to keep same in constant motion as in a revolving drum, preferably using hydrogen under pressure. The reduced material should be removed to the hydrogenation vessels without access to air, as slight contact of air with the active charcoal often decreases its efficiency at least 50%.

This application contains some subject matter derived from Serial No. 679,771, filed Feb. 24, 1912, especially as regards surface coating of active charcoal and the use of charcoal free from occluded oxygen.

To recapitulate, my invention relates to catalyzers for hydrogenating oils and the like, comprising a preferably finely-granular porous active body readily absorbent of hydrogen and other suitable gases, which body preferably is charcoal preferably carbonized at the lowest possible temperature and preferably freed from soap-forming alkalis and alkaline earths as well as toxic bodies, and preferably admixed with a metallic catalyzer, such as nickel and cobalt in admixture, such charcoal-metal catalyzer being prepared for example by mere mechanical mixing or by precipitation on the surface of the charcoal by means of an internally incorporated precipitant, to form after reduction active particles or granules carrying a coating but substantially no internally precipitated or interiorly incorporated metallic catalysts; whereby with suitably selected and properly prepared charcoal a ratio of 1:10 to 1:4 metal to charcoal affords highly efficient results.

I do not limit myself to the exact description in the foregoing but under the doctrine of equivalency may use such materials as properly stand as equivalents within the scope herein. Furthermore as regards the step of external coating of a porous body I do not limit myself to active charcoal but may use any ordinary substantially inactive charcoal derived from blood or bone and the like, or may use other porous material for the specific purpose herein set forth.

No claim is made herein to the process of forming a coated catalyst nor to a product essentially having less than a pore-plugging amount of a metallic coating, such process and product being specifically claimed in my co-pending application Serial No. 744,157, filed January 25, 1913.

What I claim is:—

1. A catalyzer comprising a porous body coated but substantially not impregnated with a metallic catalyzer.

2. A catalyzer comprising a finely-granular substantially porous body coated but substantially not impregnated with a metallic catalyzer.

3. A catalyzer comprising a finely-granular substantially porous body coated but substantially not impregnated with catalytic nickel material.

4. A catalyzer comprising active charcoal coated but substantially not impregnated with reduced nickel.

5. A catalyzer comprising finely-granular active charcoal coated but substantially not impregnated with catalytic nickel material.

6. A catalyzer comprising finely-granular wood charcoal substantially free from lime and coated but substantially not impregnated with reduced nickel.

7. A catalyzer comprising active wood charcoal and reduced nickel not exceeding in amount 20% of the charcoal.

8. A catalyzer comprising finely-granular wood charcoal and reduced nickel not exceeding in amount 20% of the charcoal.

Signed at Montclair in the county of Essex and State of New Jersey this 23d day of December A. D. 1912.

CARLETON ELLIS.

Witnesses:
B. M. ELLIS,
A. A. WELLS.